(12) United States Patent
Horesh et al.

(10) Patent No.: US 11,379,553 B2
(45) Date of Patent: Jul. 5, 2022

(54) INTERPRETABLE SYMBOLIC DECOMPOSITION OF NUMERICAL COEFFICIENTS

(71) Applicant: International Business Machines Corporation, Armonk, NY (US)

(72) Inventors: Lior Horesh, North Salem, NY (US); Giacomo Nannicini, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 15/867,113

(22) Filed: Jan. 10, 2018

(65) Prior Publication Data

US 2019/0212979 A1 Jul. 11, 2019

(51) Int. Cl.
*G06F 17/11* (2006.01)
*G06N 5/02* (2006.01)
*G06N 3/08* (2006.01)
*G06N 5/00* (2006.01)

(52) U.S. Cl.
CPC ............. *G06F 17/11* (2013.01); *G06N 3/08* (2013.01); *G06N 5/003* (2013.01); *G06N 5/02* (2013.01)

(58) Field of Classification Search
CPC ...... G06F 7/483; G06F 40/111; G06F 40/205; G06F 17/10; G06K 2209/01; G06K 9/726; G06K 9/469
See application file for complete search history.

(56) References Cited

U.S. PATENT DOCUMENTS

| 6,243,851 | B1 | 6/2001 | Hwang et al. | |
|---|---|---|---|---|
| 8,060,550 | B2* | 11/2011 | Fit-Florea | G06F 7/72 708/277 |
| 8,943,113 | B2 | 1/2015 | Yi | |
| 2008/0263403 | A1* | 10/2008 | Soklakov | G06K 9/726 714/38.1 |
| 2010/0281350 | A1* | 11/2010 | Xie | G06F 40/211 714/811 |
| 2014/0115447 | A1* | 4/2014 | Elseth | G06F 17/10 715/249 |
| 2017/0004231 | A1 | 1/2017 | Avron et al. | |

OTHER PUBLICATIONS

Borwein et al. "A Dictionary of Real Numbers," Wadsworth & Brooks/Cole Advanced Books & Software, ISBN 9781461585121, Pacific Grove, CA, 1990.

(Continued)

*Primary Examiner* — Matthew D Sandifer
(74) *Attorney, Agent, or Firm* — Cantor Colburn LLP; Stosch Sabo

(57) ABSTRACT

A method includes receiving, by a controller, a numerical coefficient to decompose into at least one mathematical expression. The method also includes decomposing, by the controller, the numerical coefficient into the at least one mathematical expression. Decomposing takes into account a complexity cost of the at least one mathematical expression. The method also includes generating an output data that comprises the at least one mathematical expression.

17 Claims, 5 Drawing Sheets

(56) References Cited

OTHER PUBLICATIONS

Hua et al. "EdSketch: Execution-Driven Sketching for Java," Proceedings of International SPIN Symposium on Model Checking of Software, Santa Barbara, CA, USA, Jul. 13-14, 2017 (SPIN '17), 10 pages.
Jha et al. "A theory of formal synthesis via inductive learning," Acta Informatica, Nov. 2017, vol. 54, Issue 7, 30 pages.
Reynolds et al. "Refutation-based synthesis in SMT," Formal Methods in System Design, Springer Science+Business Media New York 2017, Feb. 16, 2017, 30 pages.
"Inverse Symbolic Calculator Plus," http://isc.carma.newcastle.edu.au/ (retrieved Dec. 28, 2017), 1 page.
Anonymous, "Symbolic Regression for Big Data Driven Physics Modeling," IPCOM000250347D, Jul. 2017, 5 pages.
Borwein et al., "Pi and the AGM: A Study in Analytic Number Theory and Computational Complexity," Wiley, New York, 1987.
Flajolet et al., "Analytic Combinatorics—Symbolic Combinatorics," ALCOM-FT, Contract No. IST-1999-14186, 2002, 196 pages.
Horesh et al., "Globally Optimal Mixed Integer Non-Linear Programming (MINLP) Formulation for Symbolic Regression," 2016, 10 pages.
Theis, "On the complexity of integer programming and of solving diophantine equations," IPCOM000138253D, Jul. 2006, 20 pages.
Theis, "On the complexity of integer programming and of solving diophantine equations," IPCOM000143451D, Nov. 2006, 20 pages.

\* cited by examiner

INTERPRETABLE SYMBOLIC DECOMPOSITION OF NUMERICAL COEFFICIENTS

TECHNICAL FIELD

The present invention relates in general to computer-based analysis of numerical coefficients. More specifically, the present invention relates to automatically determining how to decompose and/or break up a numerical coefficient into constituent components that the numerical coefficient is actually based on, where the constituent components are more recognizable and/or understandable to a user.

BACKGROUND

Numerical coefficients can be contained within symbolic expressions. A symbolic expression can be used to explain a relationship between one or more variables. For example, a variable such as a length of a pendulum ("1") can determine a period "T" of the pendulum (i.e., a length of time for the pendulum to swing back-and-forth), where:

$$T = 6.28318 \times \sqrt{\frac{l}{g}}$$

Numerical coefficients can appear as a complicated number within a symbolic expression. In the example equation above, "6.28318" can be considered to be a numerical coefficient that appears as a complicated number. However, in actuality, these complicated numbers can be based on constituent components that are more recognizable and/or understandable to a user.

SUMMARY

A method according to one or more embodiments of the invention includes receiving, by a controller, a numerical coefficient to decompose into at least one mathematical expression. The method also includes decomposing, by the controller, the numerical coefficient into the at least one mathematical expression. Decomposing takes into account a complexity cost of the at least one mathematical expression. The method also includes generating an output data that includes the at least one mathematical expression.

A computer system according to one or more embodiments of the invention includes a memory and a processor system communicatively coupled to the memory. The processor system is configured to perform a method that includes receiving a numerical coefficient to decompose into at least one mathematical expression. The method also includes decomposing the numerical coefficient into the at least one mathematical expression. Decomposing takes into account a complexity cost of the at least one mathematical expression. The method also includes generating an output data that includes the at least one mathematical expression.

A computer program product according to one or more embodiments of the invention includes a computer-readable storage medium having program instructions embodied therewith. The program instructions are readable by a processor system to cause the processor system to receive a numerical coefficient to decompose into at least one mathematical expression. The processor system is also caused to decompose the numerical coefficient into the at least one mathematical expression. Decomposing takes into account a complexity cost of the at least one mathematical expression. The processor system is also caused to generate an output data that includes the at least one mathematical expression.

BRIEF DESCRIPTION OF THE DRAWINGS

The subject matter of one or more embodiments of the present invention is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
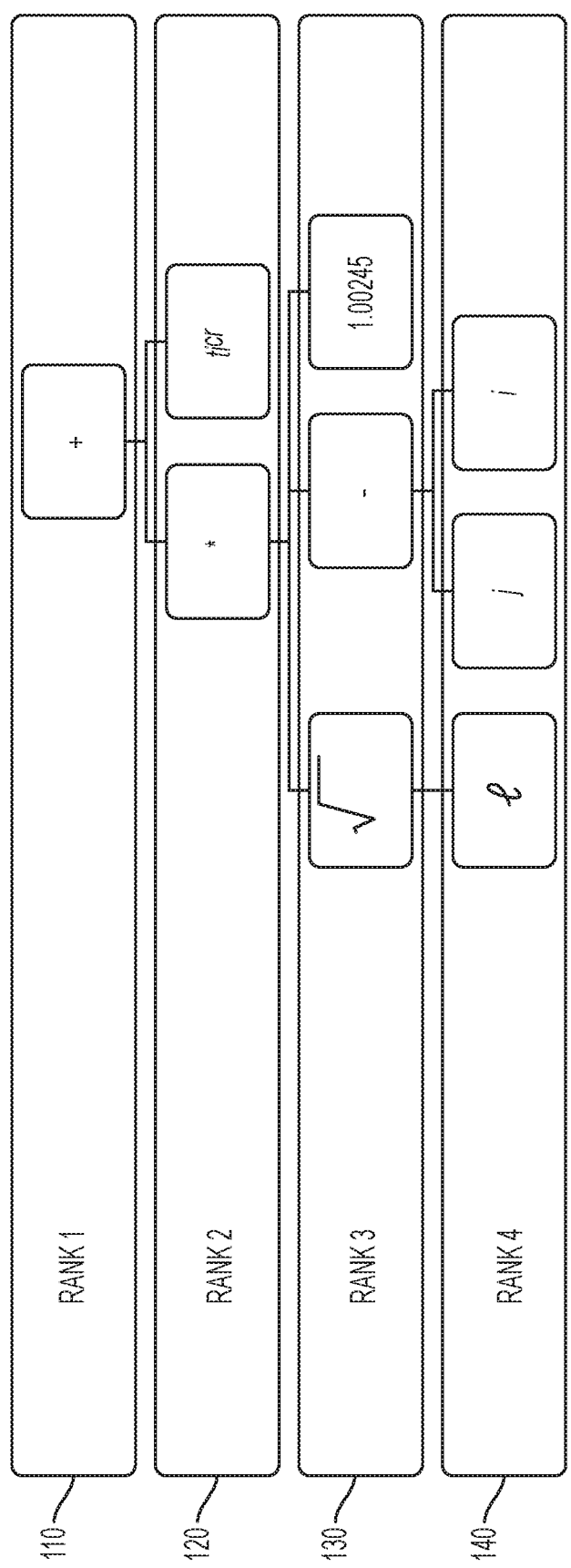
FIG. 1 illustrates a symbolic expression that is represented via a computer-implemented expression tree in accordance with one or more embodiments of the invention.

In accordance with one or more embodiments of the present invention, methods and computer program products for decomposing numerical coefficients are provided. Various embodiments of the present invention are described herein with reference to the related drawings. Alternative embodiments of the present invention can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments of the present invention whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

Decomposition of a numerical coefficient seeks to determine the actual constituent components, if any, that the numerical coefficient is based upon, where each of the actual constituent components is more recognizable and/or understandable to the user. For example, in the above example, the numerical coefficient "6.28318" can, in actuality, be based on $\pi$, where "6.28318" can be decomposed into the mathematical expression "$2 \times \pi$", where $\pi$ is a numerical constant that is more recognizable by the user.

After decomposing a numerical coefficient into a mathematical expression that includes the actual numerical constants and actual operators that constitute the numerical coefficient, a user can more readily recognize hidden aspects that govern the actual makeup of the numerical coefficient. For example, suppose that a numerical coefficient of 4.18878 is decomposed into a mathematical expression of "$4/3 \times \pi$". By viewing this example decomposition, a user can more readily ascertain that the resulting mathematical expression resembles certain aspects of an equation for determining a spherical volume (where the volume of a sphere can be calculated as "$4/3 \times \pi \times r^3$"). As such, one or more embodiments of the invention can further examine whether or not any spherical component can possibly govern the actual makeup of the numerical coefficient. Therefore, by viewing this example decomposition, the user can determine aspects that govern the actual makeup of the numerical coefficient, where these aspects were previously hidden from the user.

However, correctly decomposing a numerical coefficient into its actual constituent components can be difficult because any numerical coefficient can be decomposed into a multitude of mathematical expressions that all accurately reflect the value of the numerical coefficient but do not accurately represent the actual constituent components of the numerical coefficient. In other words, the value of a numerical coefficient can potentially be arrived at by a multitude of mathematical expressions, while only one of the mathematical expressions, if any, accurately represents the actual constituent components of the numerical coefficient.

For example, referring again to the numerical coefficient "6.28318," suppose that "$2 \times \pi$" is the mathematical expression that accurately reflects the actual constituent components of "6.28318." Nevertheless, the value of this numerical coefficient can be arrived at by a multitude of other possible mathematical expressions (e.g., "$0.64048 \times g$", "$(0.6116 \times g)+(0.08019)^{1/2}$", "$\varepsilon_0 \times 0.709628046$", "$(0.72163 \times R)+0.28318$" where corresponds to the gravitational constant, where "$\varepsilon_0$" corresponds to the elect constant permittivity of free space, and where "R" corresponds to the gas constant. Although these other possible mathematical expressions all accurately arrive at the value of numerical coefficient "6.28318," these other possible mathematical expressions erroneously represent the actual constituent components of the numerical coefficient.

When decomposing a numerical coefficient using the conventional computer-implemented approaches, the decomposition generally results in a large number of mathematical expressions that each has a value that accurately reflects the value of the numerical coefficient. However, as described above, although these mathematical expressions accurately reflect the value of the numerical coefficient, only one of the possible mathematical expressions, if any, accurately represents the actual constituent components of the numerical coefficient. Therefore, the conventional approaches typically generate a multitude of mathematical expressions that erroneously represent the actual constituent components of the numerical coefficient.

When decomposing a numerical coefficient, one or more embodiments of the present invention attempt to reduce the number of erroneous mathematical expressions by limiting the resulting mathematical expressions to expressions that are more likely to accurately reflect the actual constituent components of the numerical coefficient. One or more embodiments of the invention generate mathematical expressions that are more likely to accurately reflect the actual constituent components by producing mathematical expressions of lower complexity, thus largely avoiding convoluted mathematical expressions, where convoluted mathematical expressions tend to be erroneous mathematical expressions. One or more embodiments of the invention also generate mathematical expressions that are more likely to accurately reflect the actual constituent components by receiving input regarding components that are more likely or less likely to be actual constituent components. One or more embodiments then generate mathematical expressions based on the received input, thus generating mathematical expressions that are more likely to accurately reflect the actual constituent components of the numerical coefficient.

Therefore, in contrast to the conventional approaches, when decomposing a numerical coefficient, one or more embodiments of the invention (1) receives user input regarding components that are more likely or less likely to be actual constituent components of the numerical coefficient, (2) generates mathematical expressions by taking the user input into account, and (3) reduces the resulting number of mathematical expressions that erroneously represent the actual constituent components by generating mathematical expressions with a lower complexity.

With one or more embodiments of the invention, when using a computer-implemented method to decompose a numerical coefficient, a user can be aware of certain types of numerical constants that are more likely to appear in a mathematical expression that accurately reflects the actual constituent components of the numerical coefficient. Specifically, the user can be aware that a mathematical expression that accurately reflects the actual constituent components of the numerical coefficient is likely to include certain types of numerical constants which often appear in the same subject matter, scientific field, and/or technological field for which the numerical coefficient belongs to. Numerical constants which appear in the same subject matter, scientific field, and/or technological field as the numerical coefficient can be referred to as relevant numerical constants. Similarly, the user can also be aware that the mathematical expression is unlikely to include certain other types of numerical constants that appear in a different subject matter, different scientific field, and/or different technological field for which the numerical coefficient belongs to. Numerical constants which appear in a different subject matter, different scientific field, and/or different technological field as the numerical coefficient can be referred to as irrelevant numerical constants.

For example, a user can know that a numerical coefficient that relates to classic motion and/or kinematics is more likely to be based on numerical constants that are often used in the field of classic motion and/or kinematics, as compared to being based on numerical constants that are often used in the field of electromagnetism. Specifically, the user can know that the numerical coefficient is more likely to be based on a gravitational constant ($9.81$ m/s$^2$) as compared to being based on an electron charge constant ($1.60217662 \times 10^{-19}$ coulomb). Therefore, as discussed above, the user can be aware that a mathematical expression that accurately reflects the actual constituent components of the above-described numerical coefficient is more likely to include the gravitational constant (i.e., a relevant numerical constant) and less likely to include the electron charge constant (i.e., an irrelevant numerical constant).

With one or more embodiments of the invention, the user can provide an input that identifies these relevant numerical constants and/or identifies these irrelevant numerical constants. The user can provide the input to a computer system that performs the decomposition of a numerical coefficient. Next, by incentivizing the computer system to decompose the numerical coefficient into mathematical expressions that use the identified relevant numerical constants, the user can focus the computer system on decomposing the numerical coefficient into mathematical expressions that are more likely to accurately reflect the numerical coefficient's actual constituent components. Further, the computer system can be dis-incentivized from decomposing the numerical coefficient into mathematical expressions that use the identified irrelevant numerical constants. As discussed in more detail below, one or more embodiments can incentivize use of relevant numerical constants (and can dis-incentivize use of irrelevant numerical constants) by using a computer-implemented system of complexity costs, as described in more detail below.

With one or more embodiments of the invention, in addition to identifying relevant numerical constants to the computer system, a user can also identify the types of relevant operators that are more likely to be used by a mathematical expression that accurately represents the actual constituent components of the numerical coefficient. The operators can be chosen from mathematical operators such as, for example, symbols for addition, subtraction, multiplication, division, square root, cosine, sine, exponents, etc. Similarly, the user can also identify irrelevant operators that are unlikely to be used by the mathematical expression that accurately represents the actual constituent components of the numerical coefficient. Next, by incentivizing the computer system to decompose the numerical coefficient into mathematical expressions that use the identified relevant operators, the user can focus the computer system on decomposing the numerical coefficient into mathematical expressions that are more likely to accurately reflect the numerical coefficient's actual constituent components. Further, the computer system can be dis-incentivized from decomposing the numerical coefficient into mathematical expressions that use the identified irrelevant operators.

As discussed above, when decomposing a numerical coefficient, one or more embodiments can incentivize the use of relevant numerical constants and relevant operators, while dis-incentivizing the use of irrelevant numerical constants and irrelevant operators. As described in more detail below, such incentivizing and dis-incentivizing can be achieved by using a computer-implemented system that determines a complexity cost of each mathematical expression which results from a decomposition of the numerical coefficient. With one or more embodiments of the invention, a complexity cost can be considered to be a measurement that reflects a computational difficulty of a mathematical expression/problem, where an expression/problem of higher computational difficulty can require more computing resources to computationally resolve.

As discussed above, in order to reduce a number of convoluted mathematical expressions (which tend to be erroneous mathematical expressions), one or more embodiments of the present invention can consider mathematical expressions of lower complexity cost as being more likely to accurately reflect the actual constituent components of a numerical coefficient. As such, one or more embodiments of the present invention can configure the computing system to decompose the numerical coefficient into one or more mathematical expressions of lower complexity cost. For example, one or more embodiments can configure the computing system to decompose the numerical coefficient into one or more mathematical expressions of lower Kolmogorov complexity cost.

For example, one or more embodiments of the invention can decompose a numerical coefficient into one or more possible mathematical expressions, where a complexity cost is determined for each of the possible mathematical expression. One or more embodiments of the invention can then consider the mathematical expressions of lower complexity cost as being more likely to accurately reflect the constituent components of the decomposed numerical coefficient. One or more embodiments can then produce an output data for the user, where the output data corresponds to the mathematical expressions of lower complexity cost.

The complexity cost that is determined for a given mathematical expression can be based at least on the numerical constants, operands, and operators that are used within the given mathematical expression, where each numerical constant, operand, and operator is associated with its own complexity cost value. Therefore, the complexity cost that is determined for a given mathematical expression can be an aggregation of the complexity values of the numerical constants, operands, and operators upon which the given mathematical expression is based on.

As described above, a user can be aware of one or more relevant numerical constants/operators that a numerical coefficient is more likely to be based upon. The user can also be aware that the numerical coefficient is unlikely to be based on other unrelated numerical constants/operators. Further, as discussed above, when decomposing a numerical coefficient, one or more embodiments can incentivize use of relevant numerical constants and relevant operators, while dis-incentivizing use of irrelevant numerical constants and irrelevant operators.

With one or more embodiments of the invention, a computer system can be incentivized to use the relevant numerical constants and can be incentivized to use the relevant operators by assigning lower complexity costs to these relevant constants/operators. As such, in addition to reflecting a computational complexity of a constant/operator, the assigned complexity cost can reflect the user's view of whether or not the constant/operator is likely to be included in a mathematical expression that accurately represents the constituent components of the numerical coefficient.

Specifically, because the computer system is configured to decompose the numerical coefficient into one or more mathematical expressions of lower overall complexity cost, assigning lower complexity costs to the relevant constants/operators can increase the prevalence of these relevant constants/operators in the resulting mathematical expressions.

On the other hand, one or more embodiments of the invention can be dis-incentivized to use the irrelevant numerical constants and be dis-incentivized to use the irrelevant operators by assigning higher complexity costs to these irrelevant numerical constants/operators. Specifically, because the computer system is configured to decompose the numerical coefficient into one or more mathematical expressions of lower overall complexity cost, assigning higher complexity costs to the irrelevant constants/operators can reduce their prevalence in the resulting mathematical expressions.

As such, by configuring the computer system to decompose the numerical coefficients into mathematical expressions that exhibit lower aggregate complexity, one or more embodiments can incentivize the computer system to decompose numerical coefficients into mathematical expressions that use relevant numerical constants, where such mathematical expressions are more likely to accurately reflect the constituent components of the decomposed numerical coefficients.

In view of the above, by determining complexity costs for each of the mathematical expressions (which result from the decomposition of a numerical coefficient), and by outputting mathematical expressions which have a lower determined complexity cost, one or more embodiments of the present invention can determine which mathematical expressions are more likely to accurately reflect the decomposed numerical coefficient.

Further, the value of each generated mathematical expression has to accurately represent the value of the numerical coefficient that has been decomposed. As such, one or more embodiments of the invention is directed to a computer system that ensures that the value of each generated mathematical expression does not deviate from the value of the numerical coefficient beyond a given threshold. The given threshold can be configured according to a given discrepancy measurement that is provided by the user, as described in more detail below.

Finally, each of the generated mathematical expressions has to be a discernible mathematical statement. As such, the computer system of one or more embodiments of the invention can provide a computer-implemented set of grammatical rules that define a valid expression syntax for each mathematical expression. For example, one grammatical rule can be that there cannot be two consecutive operators in a valid mathematical expression. Therefore, mathematical expressions containing "++", "--", "xx", etc., can be considered to have an invalid expression syntax. Another example mathematical rule can be that each pair of operands is to have an operator between them. As such, by ensuring that the generated mathematical expression follows a valid expression syntax, one or more embodiments of the invention can ensure that the generated mathematical expression is a discernible mathematical statement.

FIG. 1 illustrates a symbolic expression that is represented via a computer-implemented expression tree in accordance with one or more embodiments of the invention. The expression tree can be a data structure that is stored and used by a computer-based system embodying one or more aspects of the invention. In the example shown in FIG. 1, suppose that a determined symbolic expression is:

$$(\sqrt{l \times (j-i)} \times 1.00245) + ti^{cr}$$

One or more embodiments of the invention can express the symbolic expression within the expression tree by determining the operands and the operators which form the sub-expressions of the symbolic expression. Referring to FIG. 1, each level (i.e., ranks 110, 120, 130, and 140) of the expression tree corresponds to a sub-expression of the overall symbolic expression, where the top level 110 corresponds to the entire symbolic expression. From the top of the expression tree to the bottom of the expression tree, the operators are arranged in reverse-order compared to the mathematical order-of-operations. For example, according to mathematical order-of-operations, the "+" of top level 110 is applied last when mathematically calculating the above symbolic expression. The symbolic expression of FIG. 1 includes a numerical coefficient, 1.00245, at level 130. With one or more embodiments of the invention, this numerical coefficient can be decomposed into one or more possible mathematical expressions that represent the coefficient.

Figure 2:
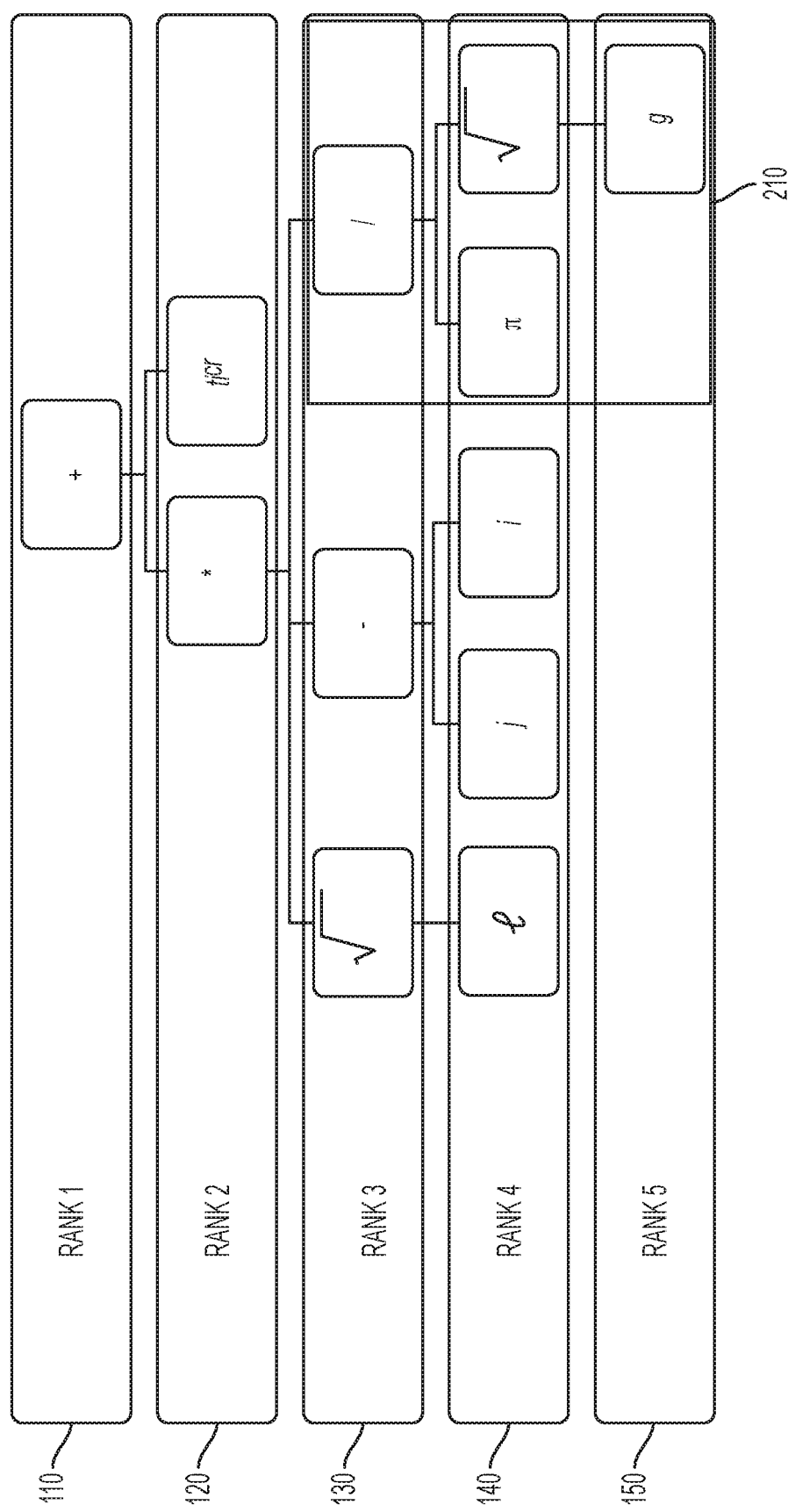
FIG. 2 illustrates decomposing a numerical coefficient into one possible mathematical expression in accordance with one or more embodiments of the invention.

FIG. 2 illustrates decomposing the numerical coefficient into one possible mathematical expression in accordance with one or more embodiments of the invention. Specifically, the numerical coefficient, 1.00245, has been decomposed into a mathematical expression 210 (which occupies levels 130, 140, and 150 of FIG. 2), as shown below:

$$\frac{\pi}{\sqrt{g}}$$

In the example of FIG. 2, the numerical coefficient (1.00245) has been decomposed into a mathematical expression 210 that uses two numerical constants ($\pi$ and gravitational constant "g") and two operators (division and square root). As described, each numerical constant and each operator can be assigned a separate complexity cost. The assigned complexity costs can be lower or higher based on which, if any, of the numerical constants/operators that the user has identified as being relevant/unrelated, as described above. One or more embodiments of the invention can then calculate an aggregate complexity cost based on the numerical constants and the operators that are used by mathematical expression 210. FIG. 2 illustrates one example mathematical expression that has been yielded by the decomposition of the numerical coefficient (1.00245). Other embodiments of the invention can decompose the numerical coefficient into a plurality of other possible mathematical expressions.

Figure 3:
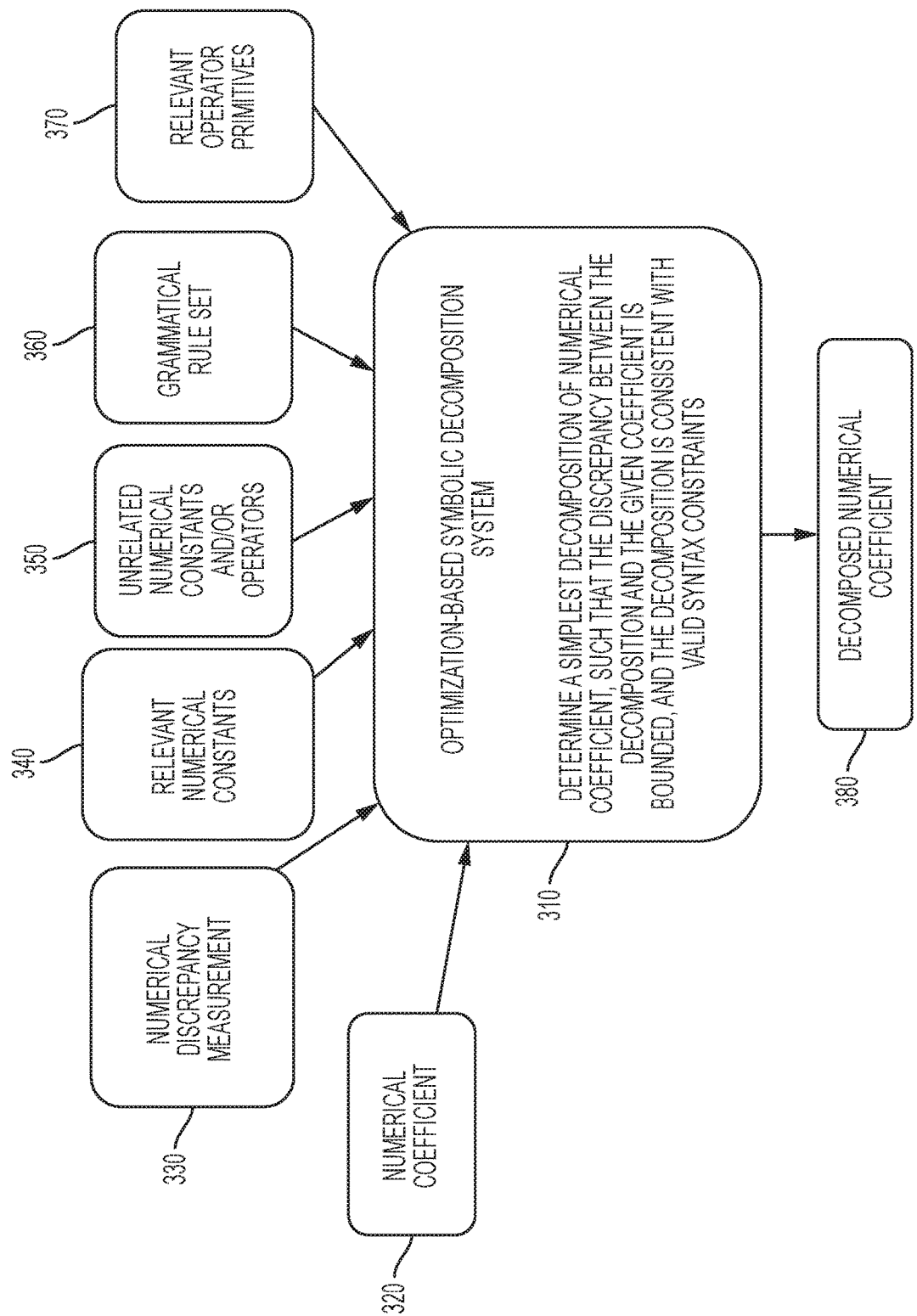
FIG. 3 illustrates inputs and outputs of a computer system in accordance with one or more embodiments of the invention.

FIG. 3 illustrates inputs and outputs of a computer system 310 in accordance with one or more embodiments of the invention. Computer system 310 can operate as an optimization-based symbolic decomposition system, for example. As described above, one or more embodiments of the invention can input a numerical coefficient 320 into the computer system 310. Computer system 310 can be or can operate in conjunction with a machine-learning system that has been trained to decompose numerical coefficients. The numerical coefficient 320 can be a coefficient that is to be decomposed. Further, a user can provide a numerical discrepancy measurement 330. As described above, in order to ensure that the decomposition yields mathematical expressions that accurately represent the decomposed numerical coefficient 320, one or more embodiments of the invention ensures that the values of the mathematical statements do not deviate from the value of the numerical coefficient 320 beyond a given threshold. This threshold can be based on the user-provided numerical discrepancy measurement 330.

With one or more embodiments of the invention, a user can also identify/provide one or more relevant numerical constants 340 that are more likely to be used within a mathematical expression that accurately reflects a decomposition of the numerical coefficient 320. The identified relevant numerical constants 340 can be assigned lower complexity costs, as described above.

With one or more embodiments of the invention, a user can also identify/provide one or more unrelated numerical constants and/or operators 340 that are less likely to be used within a mathematical expression that accurately reflects a decomposition of the numerical coefficient 320. The identified unrelated numerical constants and/or operators 350 can be assigned higher complexity costs, as described above.

With one or more embodiments of the invention, a user can also identify/provide one or more relevant operator primitives 370 that are more likely to be used within a mathematical expression that accurately reflects a decomposition of the numerical coefficient 320. The identified relevant operator primitives 370 can be assigned lower complexity costs, as described above.

With one or more embodiments of the invention, computer system 310 can also receive/apply a grammatical rule set 360 to ensure that the symbolic expression meets all syntax requirements.

With one or more embodiments of the invention, computer system 310 can then determine a simplest decomposition of a numerical coefficient, where the discrepancy between the value of the mathematical expression and the value of the numerical coefficient is limited (bounded) to within a given threshold that is based on the user-provided numerical discrepancy measurement 330. With one or more embodiments of the invention, computer system 310 can operate by solving an optimization problem (articulated as a mixed-integer nonlinear programming problem) whose solution provides the decomposition of numerical coefficients into one or more expressions. With one or more embodiments, computer system 310 can use one or more existing approaches for determining the solution of mixed-integer nonlinear programming problems to provide a certificate of global optimality of such decomposition. As described above, computer system 310 can receive a defined set of relevant operator primitives 370, a set of relevant numerical constants 340 (and the symbols associated with the relevant numerical constants 340), a grammatical rule set 360 (that defines the grammar of valid mathematical expressions), and/or a numerical coefficient 320. Upon receiving these inputs, the computer system 310 performs a search in a space of valid decompositions which match the numerical coefficient 320, where the result of the search comprises a mathematical expression of a simplest complexity.

The computer system 310 generates and/or outputs data 380 that corresponds to a decomposition of the numerical coefficient 320. The decomposition can correspond to a mathematical expression of a low or lowest determined complexity cost.

Figure 4:
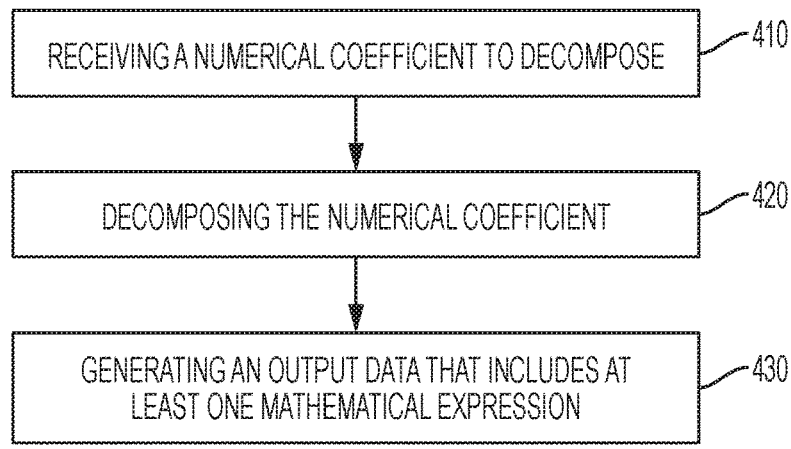
FIG. 4 depicts a flowchart of a method in accordance with one or more embodiments of the invention.

FIG. 4 depicts a flowchart of a method in accordance with one or more embodiments of the invention. The method of FIG. 4 can be performed by a controller of a system that is configured to decompose numerical coefficients. The method of FIG. 4 can be performed by a computer system that can be or that can operate in conjunction with a machine-learning system that has been trained to decompose numerical coefficients into mathematical expressions. The machine-learning system can be based on, for example, one or more artificial neural networks (ANNs), which can use electronic components that mimic the processing architecture of the human brain. Artificial neural networks are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning.

The method includes, at block 410, receiving, by a controller, a numerical coefficient to decompose into at least one mathematical expression. The method also includes, at block 420, decomposing, by the controller, the numerical coefficient into the at least one mathematical expression. Decomposing takes into account a complexity cost of the at least one mathematical expression. The method also includes, at block 430, generating an output data that includes the at least one mathematical expression.

Figure 5:
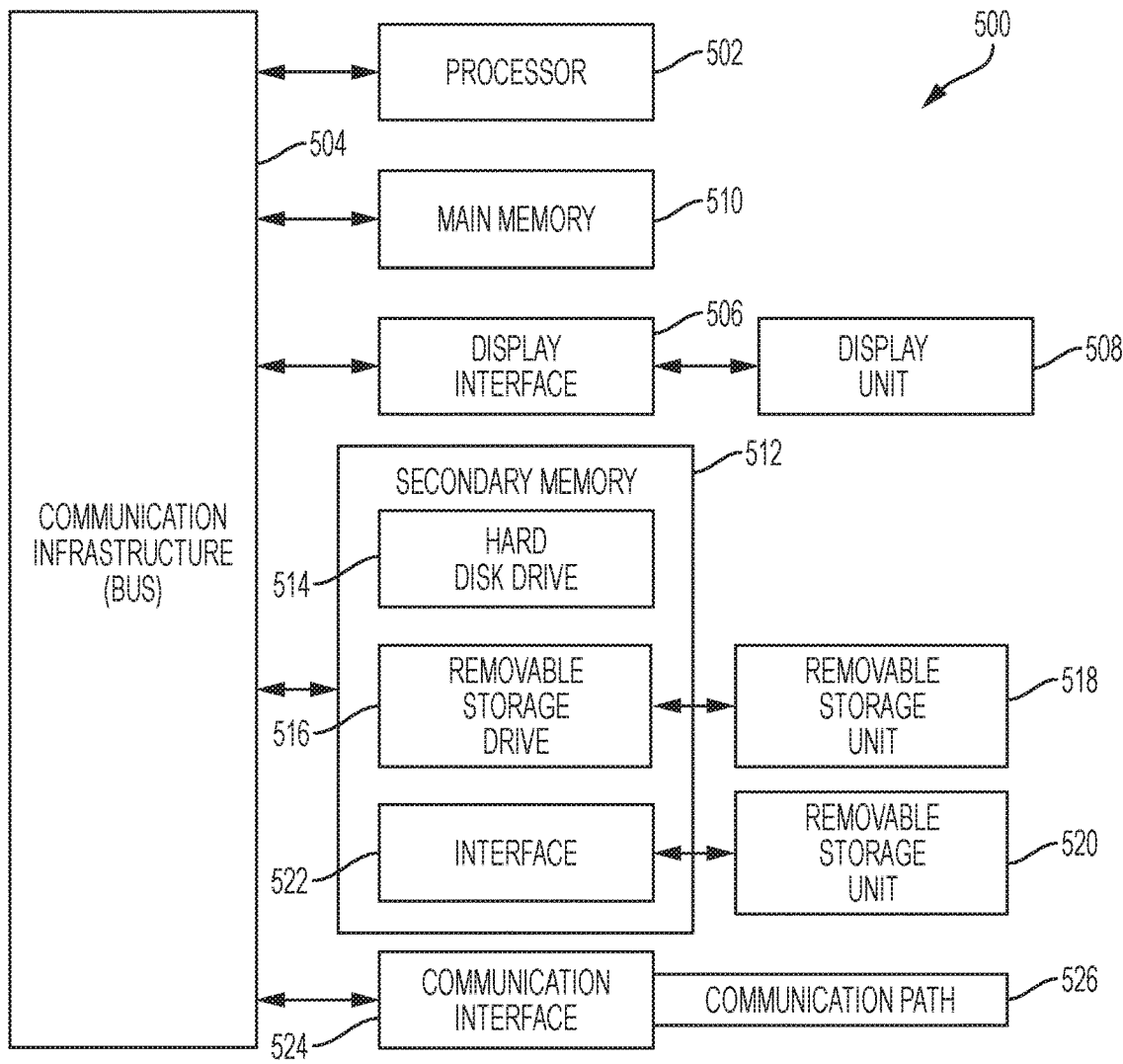
FIG. 5 depicts a high-level block diagram of a computer system, which can be used to implement one or more embodiments of the present invention.

FIG. 5 depicts a high-level block diagram of a computer system 500, which can be used to implement one or more embodiments of the invention. Computer system 500 can correspond to, at least, a machine-learning system that is configured to decompose a numerical coefficient, for example. Computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc.

which is read by and written to by removable storage drive 516. As will be appreciated, removable storage unit 518 includes a computer-readable medium having stored therein computer software and/or data.

In alternative embodiments of the invention, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via a communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the foregoing detailed description that one or more of the invention provide technical benefits and advantages.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Figure 6:
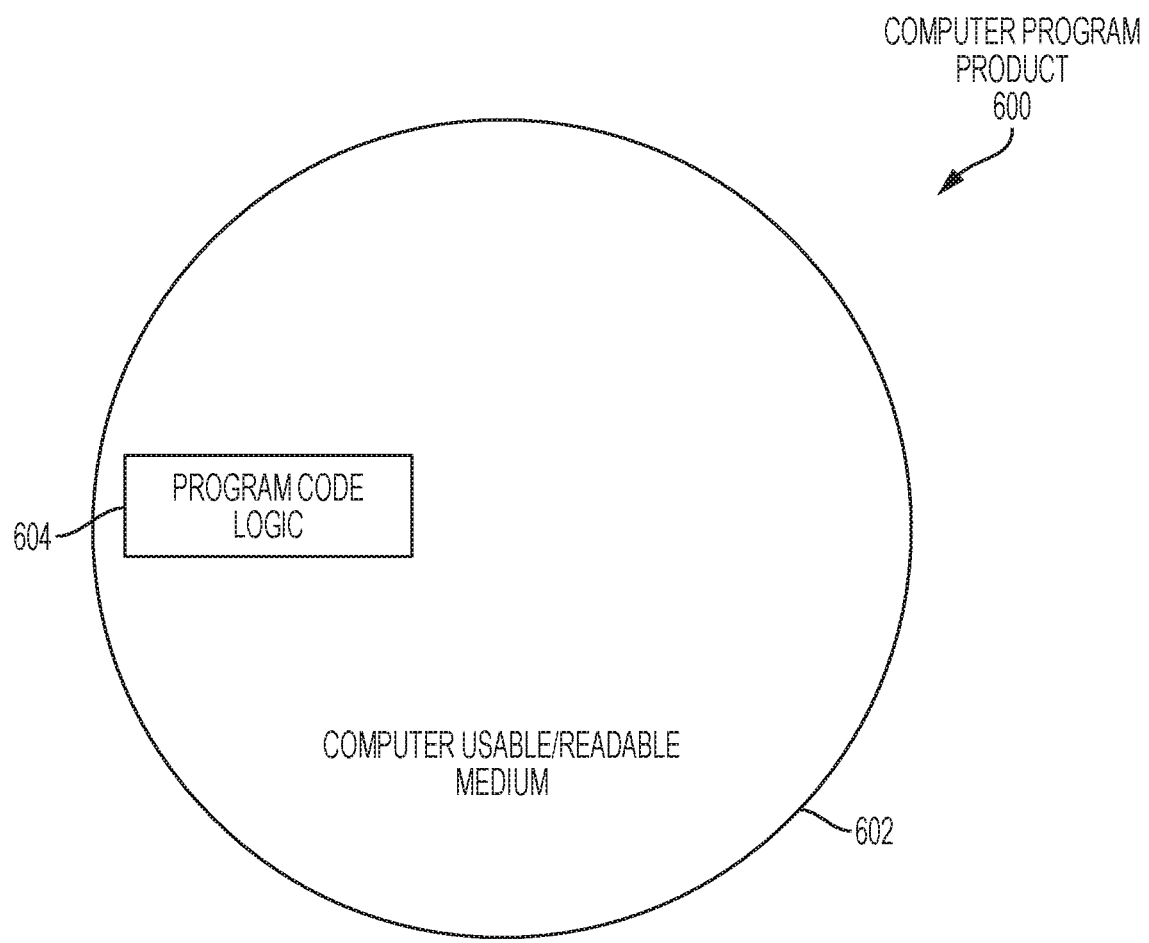
FIG. 6 depicts a computer program product, in accordance with one or more embodiments of the present invention.

FIG. 6 depicts a computer program product 600, in accordance with an embodiment. Computer program product 600 includes a computer-readable storage medium 602 and program instructions 604.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, the method comprising:
    receiving, by a controller executing a machine learning system based on a neural network comprising one or more simulated neurons, a numerical coefficient to decompose into at least one mathematical expression;
    receiving, from a user, an input that identifies at least one relevant numerical constant, wherein the identified at least one relevant numerical constant is determined to be likely included within an accurate decomposition of the numerical coefficient, the at least one relevant numerical constant is assigned a lower complexity cost, wherein the at least one relevant numerical constant corresponds to a technological field of the user, and wherein assigning the lower complexity cost for the at least one relevant numerical constant comprises adjusting at least one numeric weight of the one or more simulated neurons;
    receiving, from the user, a second input that identifies at least one relevant operator, wherein the identified at least one relevant operator is determined to be likely included within an accurate decomposition of the numerical coefficient, and the at least one relevant operator is assigned a lower complexity cost;
    receiving, from the user, a third input comprising a grammatical rule set defining grammar of the at least one mathematical expression, the grammatical rule set corresponding to the technological field of the user;
    decomposing, by the controller, the numerical coefficient into the at least one mathematical expression, wherein decomposing takes into account a complexity cost of the at least one mathematical expression and the grammatical rule set; and
    generating an expression tree representation of the decomposing of the numerical coefficient into the at least one mathematical expression and outputting the expression tree representation and the at least one mathematical expression.

2. The computer-implemented method of claim 1, wherein the at least one mathematical expression comprises at least one numerical constant and at least one operator, and the complexity cost of the at least one mathematical expression is based on complexity costs that are assigned to the at least one numerical constant and the at least one operator.

3. The computer-implemented method of claim 2, further comprising receiving an input that identifies at least one unrelated numerical constant, wherein the identified at least one unrelated numerical constant is determined to be unlikely included within an accurate decomposition of the numerical coefficient, and the at least one unrelated numerical constant is assigned a higher complexity cost.

4. The computer-implemented method of claim 2, further comprising receiving an input that identifies at least one relevant operator, wherein the identified at least one relevant operator is determined to be likely included within an accurate decomposition of the numerical coefficient, and the at least one relevant operator is assigned a lower complexity cost.

5. The computer-implemented method of claim 2, further comprising receiving an input that identifies at least one unrelated operator, wherein the identified at least one unrelated operator is determined to be unlikely included within an accurate decomposition of the numerical coefficient, and the at least one unrelated operator is assigned a higher complexity cost.

6. The computer-implemented method of claim 1, wherein a value of the mathematical expression does not deviate from the numerical coefficient beyond a threshold, and the decomposing comprises solving an optimization problem that corresponds to a mixed-integer nonlinear programming problem.

7. A computer system comprising:
a memory; and
a processor system communicatively coupled to the memory;
the processor system configured to perform a method comprising:
receiving, by a machine learning system based on a neural network comprising one or more simulated neurons, a numerical coefficient to decompose into at least one mathematical expression;
receiving, from a user, an input that identifies at least one relevant numerical constant, wherein the identified at least one relevant numerical constant is determined to be likely included within an accurate decomposition of the numerical coefficient, the at least one relevant numerical constant is assigned a lower complexity cost, wherein the at least one relevant numerical constant corresponds to a technological field of the user, and wherein assigning the lower complexity cost for the at least one relevant numerical constant comprises adjusting at least one numeric weight of the one or more simulated neurons;
receiving, from the user, a second input that identifies at least one relevant operator, wherein the identified at least one relevant operator is determined to be likely included within an accurate decomposition of the numerical coefficient, and the at least one relevant operator is assigned a lower complexity cost;
receiving, from the user, a third input comprising a grammatical rule set defining grammar of the at least one mathematical expression, the grammatical rule set corresponding to the technological field of the user;
decomposing the numerical coefficient into the at least one mathematical expression, wherein decomposing takes into account a complexity cost of the at least one mathematical expression and the grammatical rule set; and
generating an expression tree representation of the decomposing of the numerical coefficient into the at least one mathematical expression and outputting the expression tree representation and the at least one mathematical expression.

8. The computer system of claim 7, wherein the at least one mathematical expression comprises at least one numerical constant and at least one operator, and the complexity cost of the at least one mathematical expression is based on complexity costs that are assigned to the at least one numerical constant and the at least one operator.

9. The computer system of claim 8, wherein the method further comprises receiving an input that identifies at least one unrelated numerical constant, wherein the identified at least one unrelated numerical constant is determined to be unlikely included within an accurate decomposition of the numerical coefficient, and the at least one unrelated numerical constant is assigned a higher complexity cost.

10. The computer system of claim 8, wherein the method further comprises receiving an input that identifies at least one relevant operator, wherein the identified at least one relevant operator is determined to be likely included within an accurate decomposition of the numerical coefficient, and the at least one relevant operator is assigned a lower complexity cost.

11. The computer system of claim 8, wherein the method further comprises receiving an input that identifies at least one unrelated operator, wherein the identified at least one unrelated operator is determined to be unlikely included within an accurate decomposition of the numerical coefficient, and the at least one unrelated operator is assigned a higher complexity cost.

12. The computer system of claim 7, wherein a value of the mathematical expression does not deviate from the numerical coefficient beyond a threshold, and the decomposing comprises solving an optimization problem that corresponds to a mixed-integer nonlinear programming problem.

13. A computer program product comprising a computer-readable storage medium having program instructions embodied therewith, the program instructions readable by a processor system to cause the processor system to:
receive, by a machine learning system based on a neural network comprising one or more simulated neurons, a numerical coefficient to decompose into at least one mathematical expression;
receive, from a user, an input that identifies at least one relevant numerical constant, wherein the identified at least one relevant numerical constant is determined to be likely included within an accurate decomposition of the numerical coefficient, the at least one relevant numerical constant is assigned a lower complexity cost, wherein the at least one relevant numerical constant corresponds to a technological field of the user, and wherein assigning the lower complexity cost for the at least one relevant numerical constant comprises adjusting at least one numeric weight of the one or more simulated neurons;
receive, from the user, a second input that identifies at least one relevant operator, wherein the identified at least one relevant operator is determined to be likely included within an accurate decomposition of the numerical coefficient, and the at least one relevant operator is assigned a lower complexity cost;
receive, from the user, a third input comprising a grammatical rule set defining grammar of the at least one mathematical expression, the grammatical rule set corresponding to the technological field of the user;
decompose the numerical coefficient into the at least one mathematical expression, wherein decomposing takes into account a complexity cost of the at least one mathematical expression and the grammatical rule set; and
generate an expression tree representation of the decomposing of the numerical coefficient into the at least one mathematical expression and outputting the expression tree representation and the at least one mathematical expression.

14. The computer program product of claim 13, wherein the at least one mathematical expression comprises at least one numerical constant and at least one operator, and the complexity cost of the at least one mathematical expression is based on complexity costs that are assigned to the at least one numerical constant and the at least one operator.

15. The computer program product of claim 14, wherein the processor system is further caused to receive an input that identifies at least one unrelated numerical constant, wherein the identified at least one unrelated numerical constant is determined to be unlikely included within an accurate decomposition of the numerical coefficient, and the at least one unrelated numerical constant is assigned a higher complexity cost.

16. The computer program product of claim 14, wherein the processor system is further caused to receive an input that identifies at least one relevant operator, wherein the identified at least one relevant operator is determined to be likely included within an accurate decomposition of the numerical coefficient, and the at least one relevant operator is assigned a lower complexity cost.

17. The computer program product of claim 14, wherein the processor system is further caused to receive an input that identifies at least one unrelated operator, wherein the identified at least one unrelated operator is determined to be unlikely included within an accurate decomposition of the numerical coefficient, and the at least one unrelated operator is assigned a higher complexity cost.

* * * * *